United States Patent
Venter

(10) Patent No.: US 7,219,338 B2
(45) Date of Patent: May 15, 2007

(54) MULTI-LANGUAGE COMPILATION

(75) Inventor: Barend H. Venter, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 10/397,032

(22) Filed: Mar. 25, 2003

(65) Prior Publication Data

US 2004/0194072 A1  Sep. 30, 2004

(51) Int. Cl.
G06F 9/45  (2006.01)

(52) U.S. Cl. ............... 717/140; 717/143; 717/144; 717/146

(58) Field of Classification Search ........... 717/106, 717/114, 115, 136–160, 108
See application file for complete search history.

(56) References Cited

U.S. PATENT DOCUMENTS

| | | | | |
|---|---|---|---|---|
| 5,375,242 | A | * | 12/1994 | Kumar et al. ............. 717/147 |
| 5,659,753 | A | * | 8/1997 | Murphy et al. ........... 717/147 |
| 5,812,851 | A | * | 9/1998 | Levy et al. ............... 717/147 |
| 5,826,256 | A | * | 10/1998 | Devanbu .................. 707/4 |
| 6,067,413 | A | * | 5/2000 | Gustafsson et al. ....... 717/114 |
| 6,182,281 | B1 | | 1/2001 | Nackman et al. |
| 6,189,019 | B1 | | 2/2001 | Blumer et al. |
| 6,209,142 | B1 | | 4/2001 | Vermeire et al. |
| 6,219,834 | B1 | * | 4/2001 | Soroker et al. ........... 717/145 |
| 6,219,835 | B1 | * | 4/2001 | House ..................... 717/114 |
| 6,230,117 | B1 | * | 5/2001 | Lymer et al. ............. 703/22 |
| 6,378,126 | B2 | * | 4/2002 | Tang ....................... 717/143 |
| 6,408,431 | B1 | | 6/2002 | Heughebaert et al. |
| 6,457,172 | B1 | | 9/2002 | Carmichael et al. |
| 6,467,049 | B1 | * | 10/2002 | Robins et al. ............. 714/13 |
| 6,484,313 | B1 | | 11/2002 | Trowbridge et al. |
| 6,778,949 | B2 | * | 8/2004 | Duan et al. ............... 704/2 |
| 6,799,718 | B2 | * | 10/2004 | Chan et al. ............... 235/375 |
| 2002/0069192 | A1 | * | 6/2002 | Aegerter .................. 707/1 |
| 2003/0014237 | A1 | * | 1/2003 | Macklin ................... 704/2 |
| 2003/0051226 | A1 | * | 3/2003 | Zimmer et al. ........... 717/102 |
| 2003/0149934 | A1 | * | 8/2003 | Worden .................... 715/513 |
| 2004/0098668 | A1 | * | 5/2004 | Vehkomaki ............... 715/513 |
| 2005/0022174 | A1 | * | 1/2005 | Lauterbach et al. ...... 717/148 |
| 2005/0273315 | A1 | * | 12/2005 | Laitila ...................... 704/9 |
| 2005/0273772 | A1 | * | 12/2005 | Matsakis et al. .......... 717/136 |

OTHER PUBLICATIONS

Hartmann et al., "Documenting Software Systems with Views II: An Integrated Approach Based on XML", Oct. 2001, ACM Press, p. 237-246.*

(Continued)

*Primary Examiner*—Wei Zhen
*Assistant Examiner*—Anna Deng
(74) *Attorney, Agent, or Firm*—Amin, Turocy & Calvin, LLP

(57) ABSTRACT

A system and method for multi-language compilation is provided. The system and method provide a mechanism for two or more separately written compiler components to co-operate in the compilation of mixed language compilation units. The system mitigates problems associated with conventional approaches to dealing with embedded code blocks. Extensibility is facilitated through the use of a common compiler infrastructure (CCI) in the form of a base class library. Compilers for specific languages are written as extensions of these classes. Common conventions and a flexible extensibility mechanism facilitate cooperation amongst the compilers.

15 Claims, 8 Drawing Sheets

OTHER PUBLICATIONS

Christian Genillard, "Syntax_Analyser_G: a multi-language syntax analysis package", Jan. 1991, ACM Press, vol. XI, No. 1, p. 57-69.*

Nick Benton and Andrew Kennedy "Interlanguage Working Without Tears: Blending SML with Java", Microsoft Research, Sep. 1999, 12 pages.

Nick Benton, Andrew Kennedy and George Russell, "Compiling Standard ML to Java Bytecodes", Persimmon IT, Inc., Sep. 1998, 12 pages.

Martin C. Carlisle and Ricky E. Sward, "An Automatic "Visitor" Generator for Ada", Ada Letters, vol. XXII, No. 3, Sep. 2002, 5 pages.

Simon Peyton Jones, Mark Shields, John Launchbury and Andrew Tolmach, Bridging the gulf: a common intermediate language for ML and Haskell, 1998, 13 pages.

Norman Neff, "OO Design in Compiling an OO Language", Computer Science Dept, The College of New Jersey, 1999, 4 pages.

Axel-Tobis Schreiner and Bernd Kuhl, "Object-Oriented Compiler Construction", University of Osnabruk, Germany, 1999, 6 pages.

Matthias Zenger and Martin Odersky, "Extensible Algerbraic Datatypes with Defaults" Swiss Federal Institute of Technology, Sep. 2001, 12 pages.

Matthias Zenger and Martin Odersky, "Implementing Extensible Compilers", Swiss Federal Institute of Technology, 2001, 20 pages.

Eugene A. Zueff, "Common Compiler Infrastructure", .NET Crash Course MSR Cambridge UK, Institute for Computer Systems, Mar. 26, 2002, 23 pages.

Eugene A. Zueff, "CCI: A Modern Compiler a API for .NET with Implicit VS Integration Support", .NET ONE 2002, Frankfurt, Germany, Institute for Computer Systems, Nov. 2002, 25 pages.

Danny Soroker, Michael Karasick, John Barton and David Streeter, "Extension Mechanisms in Montana", 1997, 10 pages.

* cited by examiner

MULTI-LANGUAGE COMPILATION

TECHNICAL FIELD

The present invention relates generally to computer programming and, more particularly, to multi-language compilation of software source code.

BACKGROUND OF THE INVENTION

Computers operate under the control of a program consisting of coded, executable instructions. Typically, a program is first written as a textual representation of computer-executable instructions in a high-level language, such as BASIC, Pascal, C, C++, C#, or the like, which are more readily understood by humans. A file containing a program in high-level language form is known as source code. The high-level language statements of the source code are then translated or compiled into the coded instructions executable by the computer. Typically, a software program known as a compiler is used for this purpose.

Typically, the source code of a programming language is formed of program constructs organized in one or more program units, such as procedures, functions, blocks, modules, projects, packages and/or programs. These program units allow larger program tasks to be broken down into smaller units or groups of instructions. High-level languages generally have a precise syntax or grammar, which defines certain permitted structures for statements in the language and their meaning.

A compiler is a computer program that translates the source code, which is written in a high-level computer programming language that is easily understood by human beings, into another language, such as object code executable by a computer or an intermediate language that requires further compilation to be executable. Typically, a compiler includes several functional parts. For example, a conventional compiler may include a lexical analyzer that separates the source code into various lexical structures of the programming language, known as tokens, such as may include keywords, identifiers, operator symbols, punctuation, and the like.

A typical compiler also includes a parser or syntactical analyzer, which takes as an input the source program and performs a series of actions associated with the grammar defining the language being compiled. The parser typically builds an Abstract Syntax Tree (AST) for the statements in the source program in accordance with the grammar productions and actions. For each statement in the input source program, the parser generates a corresponding AST node in a recursive manner based on relevant productions and actions in the grammar. Parsers typically apply rules in either a "top-down" or a "bottom-up" manner to construct an AST. The AST is formed of nodes corresponding to one or more grammar productions. The parser performs syntactical checking, but usually does not check the meaning (or the semantics) of the source program.

A typical parser also may create a Name List table (also called a "symbol table") that keeps track of information concerning each identifier declared or defined in the source program. This information includes the name and type of each identifier, its class (variable, constant, procedure, etc.), nesting level of the block where declared, and other information more specific to the class.

After the source program is parsed, it is input to a semantic analyzer, which checks for semantic errors, such as the mismatching of types, etc. The semantic analyzer accesses the Name List table to perform semantic checking involving identifiers. After semantic checking, the compiler generates an Intermediate Representation (IR) from which an executable format suitable for the target computer system is generated.

Markup languages (e.g., XML) and co-ordination languages often provide a mechanism for including embedded blocks of code written in a general purpose programming and/or scripting language. This creates a situation where a single compilation unit involves more than one programming language.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a multi-language compilation system and method. The invention provides a mechanism for two or more separately written compiler components to co-operate in the compilation of mixed language compilation units. The mechanism can facilitate support for compilation environments and/or authoring aids such as syntax coloring and statement completion. The invention does not suffer from a number of problems that arise with conventional approaches to compilation of embedded of code blocks written in a general purpose programming and/or scripting language to provide for extensibility (such as the need for interpretation during execution or the requirement that the multi-language source file must first be transformed into a single source language).

Co-operation is facilitated through the use of the Common Compiler Infrastructure (CCI). A compiler for a specific language is written as extensions of base classes provided by the CCI. Common conventions and a flexible extensibility mechanism facilitate cooperation amongst compilers derived from the CCI.

In accordance with an aspect of the present invention, the base classes include visitor classes with visitor methods that are virtual and thus capable of being overridden. Visitor classes that derive from the base classes can add visitor methods to deal with new AST and IR node types that a particular compiler may need to introduce. When more than one language is present in a compilation unit more than one instance of a particular type of visitor may have to co-operate. An aspect of the present invention allows for the dynamic discovery of appropriate visitors and the transfer of state information between visitors.

The system thus overcomes problems associated with current approaches in which the markup compiler either generates an object model which is then "scripted" at run time by interpreters for the embedded code blocks, or where it is required that the markup be translated to the same language as the embedded code blocks via a code object model with the combined result then being compiled as a unit.

A primary parser component for the main (embedding) language receives a multi-language source code file and generates an AST. For example, the multi-language source code file can be based upon a markup language (e.g., XML) having embedded blocks of code written in one or more general purpose programming languages (e.g., BASIC, Pascal, C, C++, C# or the like) and/or scripting languages (e.g., Visual Basic Script or JScript). The primary parser component builds the AST for portions of the multi-language source code file written in the markup language (e.g., XML). The primary parser component performs syntactical analysis of at least part of the multi-language source code file (e.g., markup language).

When the primary parser component identifies an embedded block of code, it passes the embedded block of code to a secondary parser component associated with the embedded block of code. The secondary parser component returns an AST representing the embedded block of code and this becomes a node in the AST built by the primary parser component. The AST is built from node classes defined in CCI, when possible, and from node classes that extend appropriate CCI defined base classes, when not. The secondary parser component for embedded code blocks can also access state associated with the primary parser component. Once a secondary parser component has parsed an embedded block of code, control returns to the primary parser component.

Once the primary parser component has completed the generation of the AST, it is provided to the primary compiler component. The primary compiler component checks the AST for correctness and then transforms it into a form that corresponds to the executable format of the system on which the compiled program is to execute.

The AST checking and transformation logic is factored out of the AST node classes into separate "visitor" classes that are instantiated and invoked in a particular sequence by the primary compiler component. AST nodes have no knowledge of any specific visitor classes or methods, but provide a general mechanism for a visitor method to call the appropriate visitor method on a child node. Visitor classes extend CCI base classes that implement common logic and provide a common specification of shared state.

A CCI backend component receives the transformed AST and generates an "executable" format such as the Common Intermediate Language (CIL) of the Common Language Infrastructure (CLI), which represents the final result of compiling the multi-language source code file.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
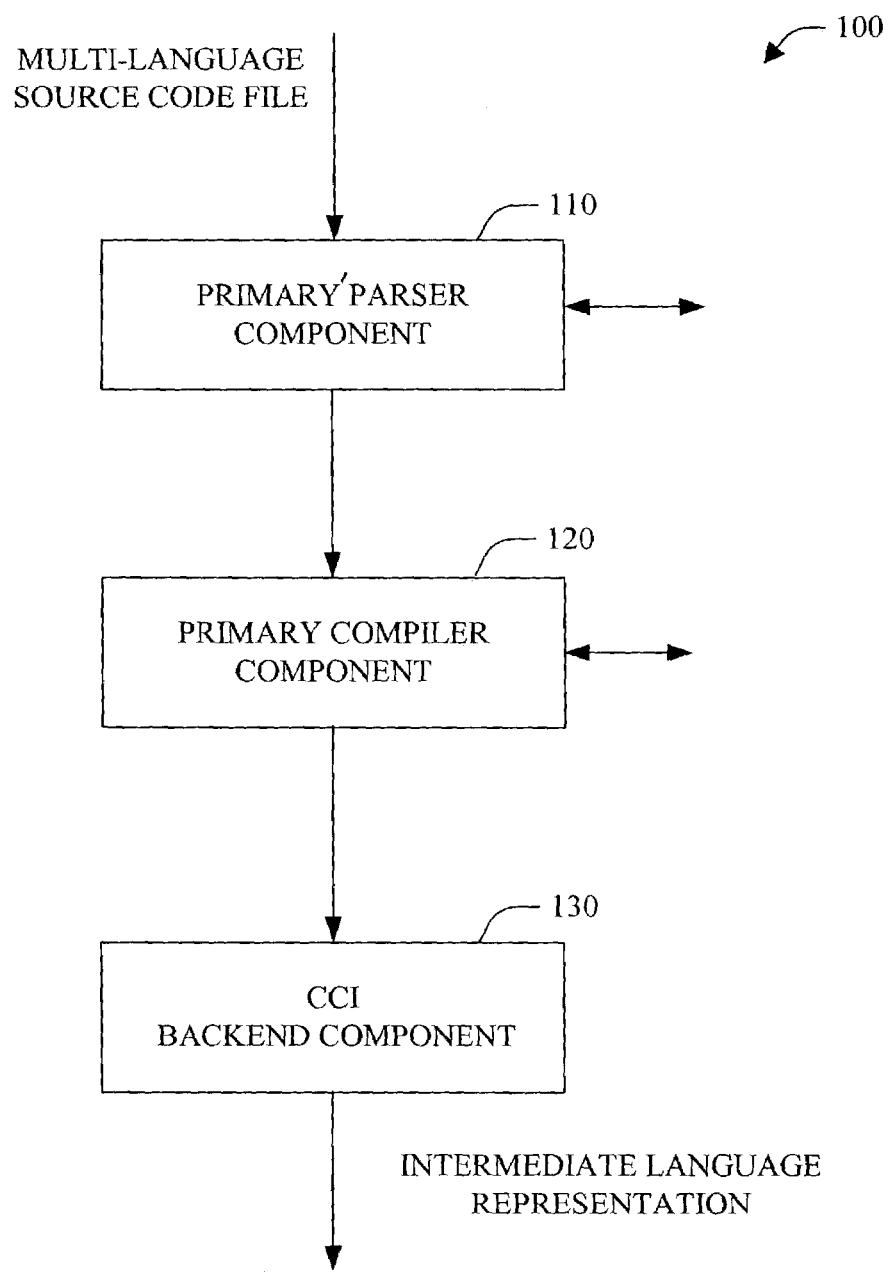
FIG. 1 is a block diagram of a multi-language compilation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Figure 2:
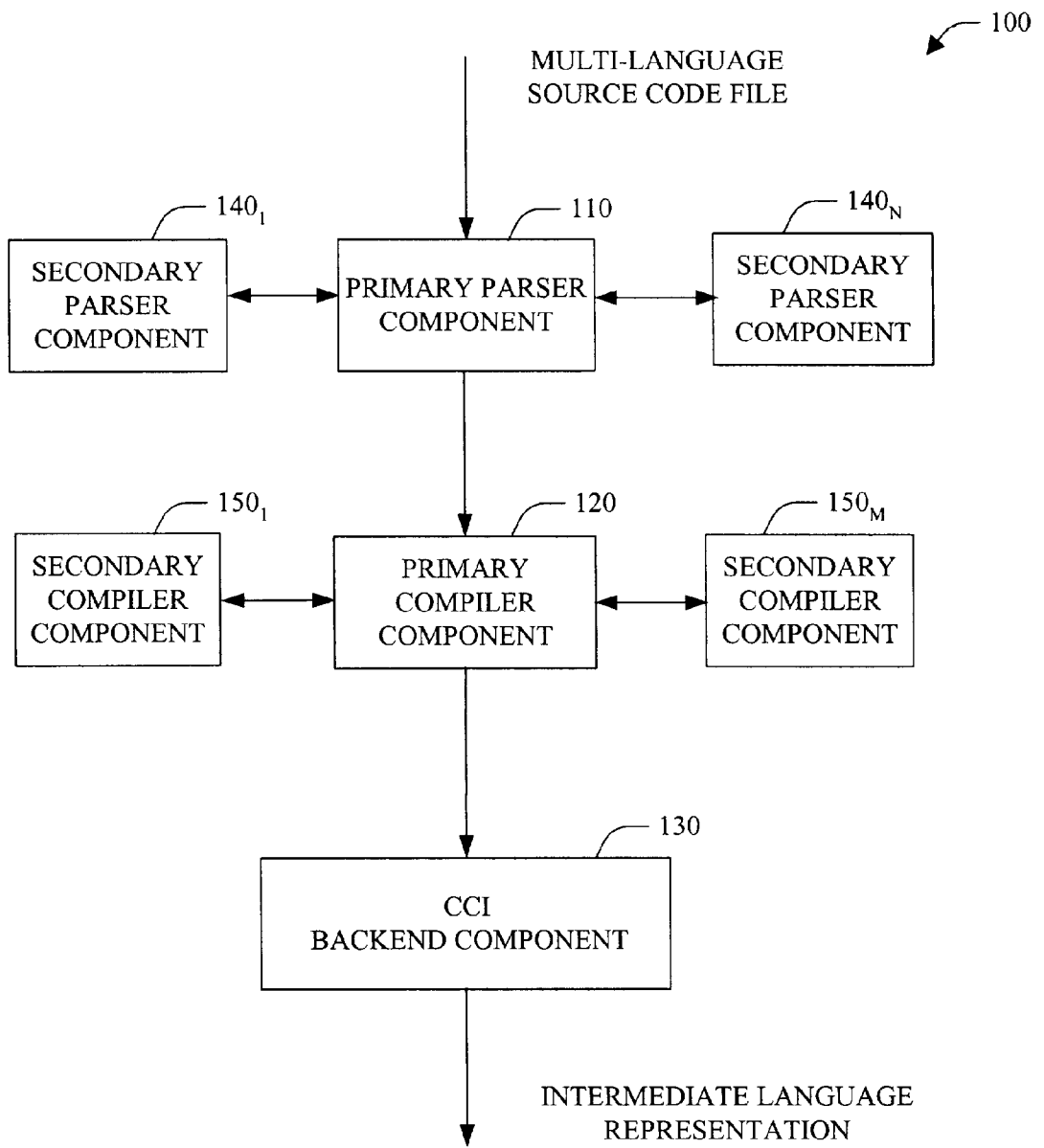
FIG. 2 is a block diagram of a multi-language compilation system in accordance with an aspect of the present invention.

Referring to FIG. 1, a multi-language compilation system 100 in accordance with an aspect of the present invention is illustrated. The system 100 includes a primary parser component 110, a primary compiler component 120 and a common compiler infrastructure (CCI) backend component 130. As illustrated in FIG. 2, optionally, the system 100 can include a first secondary parser component $140_1$ through an Nth secondary parser component $140_N$, N being an integer greater than or equal to one, and/or, a first secondary compiler component $150_1$ through an Mth secondary compiler component $150_M$, M being an integer greater than or equal to one. The first secondary parser component $140_1$ through the Nth secondary parser component $140_N$ can be referred to collectively as the secondary parser component(s) 140. Similarly, the first secondary compiler component $150_1$ through the Mth secondary compiler component $150_M$ can be referred to collectively as the secondary compiler component(s) 150.

The system 100 provides a mechanism for two or more separately written secondary compiler component(s) 150 to co-operate in the compilation of mixed language compilation units. The mechanism can facilitate support for compilation environment(s) and/or authoring aids such as syntax coloring and statement completion. The invention does not suffer from a number of problems that arise with conventional approaches to compilation of embedded of code blocks written in a general purpose programming and/or scripting language to provide for extensibility (such as the need for interpretation during execution or the requirement that the multi-language source file must first be transformed into a single source language).

Extensibility is facilitated through the use of a common compiler infrastructure (CCI). A compiler for a specific language is written as extensions of base classes provided by the CCI. Common conventions and a flexible extensibility mechanism facilitate cooperation amongst the primary parser component 110 and the secondary parser component(s) 140, and, the primary compiler component 120 and the secondary compiler component(s) 150. Thus, in accordance with an aspect of the present invention, language implementer(s) can add new intermediate representation (IR) node type(s) by providing secondary parser component(s) 140 and/or secondary compiler component(s) 150. Further, decomposition enables selective replacement of functionality.

In accordance with an aspect of the present invention, the base classes include visitor classes with visitor methods that are virtual and thus capable of being overridden. Visitor classes derived from the base classes can add visitor methods to deal with new AST and IR node types that a particular compiler may need to introduce. When more than one language is present in a compilation unit more than one instance of a particular type of visitor class may have to co-operate. An aspect of the present invention allows for the dynamic discovery of appropriate visitors and the transfer of state information between visitors.

The primary parser component 110 receives a multi-language source code file and generates an AST. For example, the multi-language source code file can based upon a markup language (e.g., XML) having embedded block(s) of code written in general purpose programming language(s) (e.g., BASIC, Pascal, C, C++, C# or the like) and/or scripting language(s) (e.g., Visual Basic Script, JScript). The AST tree is based, at least in part, upon information (e.g., node(s)) received from the secondary parser component(s) 140. The primary parser component 110 builds the AST for portion(s) of the multi-language source code file written in the markup language (e.g., XML). The primary parser component 110 can employ method(s) known to those skilled in the art to determine the linguistic constructs of the multi-language source code file and generates the AST representing the linguistic constructs of the markup language. Thus, the primary parser component 110 performs syntactical analysis of at least part of the multi-language source code file (e.g., markup language). For example, for each statement in the multi-language source code file, the primary parser component 110 can generate the AST in a recursive manner. The primary parser component 110 can apply rules in either a "top-down" or a "bottom-up" manner to construct the AST.

The primary parser component 110 can keep track of information concerning each identifier declared or defined in the multi-language source code file associated with the markup language in node(s) of the AST. The information can include the name and type of each identifier, its class (variable, constant, procedure, etc.), nesting level of the block where declared, and other information more specific to the class.

When the primary parser component 110 identifies an embedded block of code, it passes the embedded block of code to a secondary parser component 140 associated with the embedded block of code. The secondary parser component 140 can access the AST and add node(s) to the AST associated with the embedded block of code. Thus, the AST is built from nodes defined in CCI, when possible, and from node(s) that extend appropriate CCI defined base classes, when not. The secondary parser component 140 can also access state associated with the primary parser component 110 (e.g., shared state). Once the secondary parser component 140 has parsed the embedded block of code, control returns to the primary parser component 110. It is to be appreciated that one or more secondary parser component(s) 140 can be utilized by the system 100 for various general purpose programming language(s) and/or scripting language (s).

Figure 3:
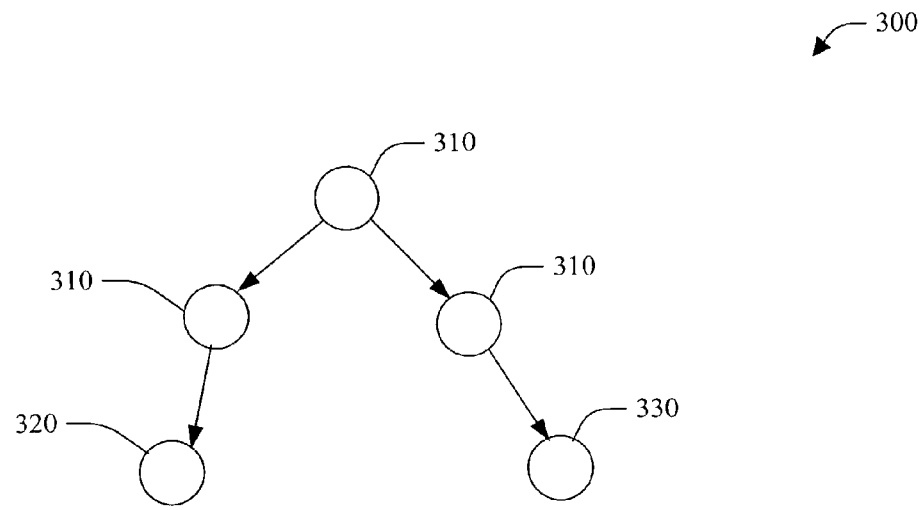
FIG. 3 is a diagram of a abstract syntax tree in accordance with an aspect of the present invention.

Referring briefly to FIG. 3, an exemplary AST 300 in accordance with an aspect of the present invention is illustrated. The AST 300 includes nodes 310 generated by the primary parser component 110, a node 320 generated by a first secondary parser component 140 and a node 330 generated by a second secondary parser component 140. While the exemplary parse tree 300 includes three nodes 310 generated by the primary parser component 110, one node 320 generated by the first secondary parser component 140 and one node 330 generated by the second secondary parser component 140, it is to be appreciated that in accordance with an aspect of the present invention, the primary parser component 110 can generate any suitable quantity of node(s) and that one or more secondary parser component(s) 140 can be employed to generate one or more node(s).

Turning back to FIGS. 1 and 2, once the primary parser component 110 and the secondary parser component(s) 140 have completed generation of the AST, it is provided to the primary compiler component 120. Thereafter, the primary compiler component 120 checks the AST for correctness and then transforms it into a form that corresponds to the executable format of the system on which the compiled program is to execute.

The AST checking and transformation logic is factored out of the AST node classes into separate "visitor" classes that are instantiated and invoked in a particular sequence by the primary compiler component 120. AST nodes have no knowledge of any specific visitor classes or methods, but provide a general mechanism for a visitor method to call the appropriate visitor method on a child node. Visitor classes extend CCI base classes that implement common logic and provide a common specification of shared state.

The primary compiler component 120 can include a semantic analyzer that accesses the multi-language source code file and/or the AST. The semantic analyzer can check for semantic error(s), such as the mismatching of types, etc. The semantic analyzer can access the AST to perform semantic checking involving identifier(s).

The primary compiler component 120 can check and transform the AST associated with the portion of the multi-language source code file associated with the markup language. When the primary compiler component 120 identifies an embedded block of code, it passes the embedded block of code to a secondary compiler component 150 associated with the embedded block of code. The secondary compiler component 150 can access the AST, check and transform node(s) of the AST associated with the embedded block of code. The secondary compiler component 150 can also access state associated with the primary compiler component 120 (e.g., shared state). Once the secondary compiler component 150 has checked and transformed the embedded block of code, control returns to the primary compiler component 120. It is to be appreciated that one or more secondary compiler component(s) 150 can be utilized by the system 100 for various general purpose programming language(s) and/or scripting language(s). The primary compiler component 120 and/or the secondary compiler component(s) 150 can translate node(s) of the AST into an IR of the multi-language source code file.

Figure 4:
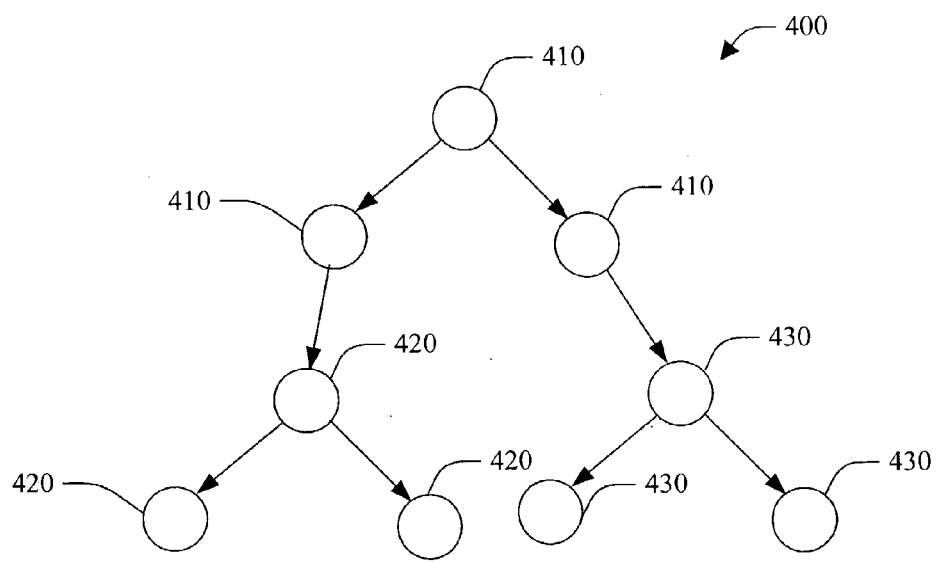
FIG. 4 is a diagram of an abstract syntax tree in accordance with an aspect of the present invention.

Turning briefly to FIG. 4, an exemplary abstract syntax tree 400 in accordance with an aspect of the present invention. The abstract syntax tree 400 includes nodes 410 generated by the primary compiler component 120, nodes 420 accessed by a first secondary compiler component 150 and nodes 430 accessed by a second secondary compiler component 150. While the exemplary abstract syntax tree 400 includes three nodes 410 accessed by the primary compiler component 120, three nodes 420 accessed by the first secondary compiler component 150 and three nodes 430 accessed by the second secondary compiler component 150, it is to be appreciated that in accordance with an aspect of the present invention, the primary compiler component 120 can access any suitable quantity of node(s) and that one or more secondary compiler component(s) 150 can be employed to access one or more node(s).

Referring back to FIG. 1, as discussed above, tree transformation logic is factored out of the node classes into separate "visitor" classes. The primary compiler component 120 can invoke visitor class(es) in order to transform the AST into an IR of the multi-language source code file. Tree node(s) have no knowledge of any specific visitor classes or methods, but provide a general mechanism for a visitor method to call the appropriate visitor method on a child node. Visitor(s) extend base classes that implement common logic and provide a common specification of shared state.

Visitor(s) can "walk" the IR of the multi-language source code file. Examples of visitors include looker, declarer, resolver, checker and/or normalizer. Looker/Declarer replace identifier node(s) with member(s)/local(s) they resolve. Resolver can resolve overloads and deduce expression result type(s). Checker can check for semantic error(s) and/or repair semantic error(s) such that subsequent walks do not need to perform error checking. Normalizer can prepare the IR for serializing (e.g., to intermediate language (IL) and metadata). It is to be appreciated that an author of a secondary compiler component 150 can define language specific visitor class(es) that extend the framework of the visitor base classes. The derived visitors provide proper functionality for the associated IR node(s). Further, a secondary compiler component 150 can define visitor(s) which perform additional IR processing.

The CCI backend component 130 receives the AST and generates a common language infrastructure (CLI) intermediate language (IL) representation of the multi-language source code file. For example, the CLI IL representation can be stored with a compiled active server page (ASP). The AST can thus serve as a high-level intermediation representation of the multi-language source code file. Optionally, the CCI backend component 130 can perform optimization of the IR.

The system 100 has been described with regard to batch compilation; however, those skilled in the art will recognize that the system 100 can be employed to incrementally compile portion(s) of a multi-language source code file.

While FIG. 1 is a block diagram illustrating components for the multi-language compilation system 100, it is to be appreciated that the multi-language compilation system 100, the primary parser component 110, the primary compiler component 120, the CCI backend component 130, the secondary parser component(s) 140 and/or the secondary compiler component(s) 150 can be implemented as one or more computer components, as that term is defined herein. Thus, it is to be appreciated that computer executable components operable to implement the multi-language compilation system 100, the primary parser component 110, the primary compiler component 120, the CCI backend component 130, the secondary parser component(s) 140 and/or the secondary compiler component(s) 150 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Turning briefly to FIGS. 5, 6, 7 and 8 methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
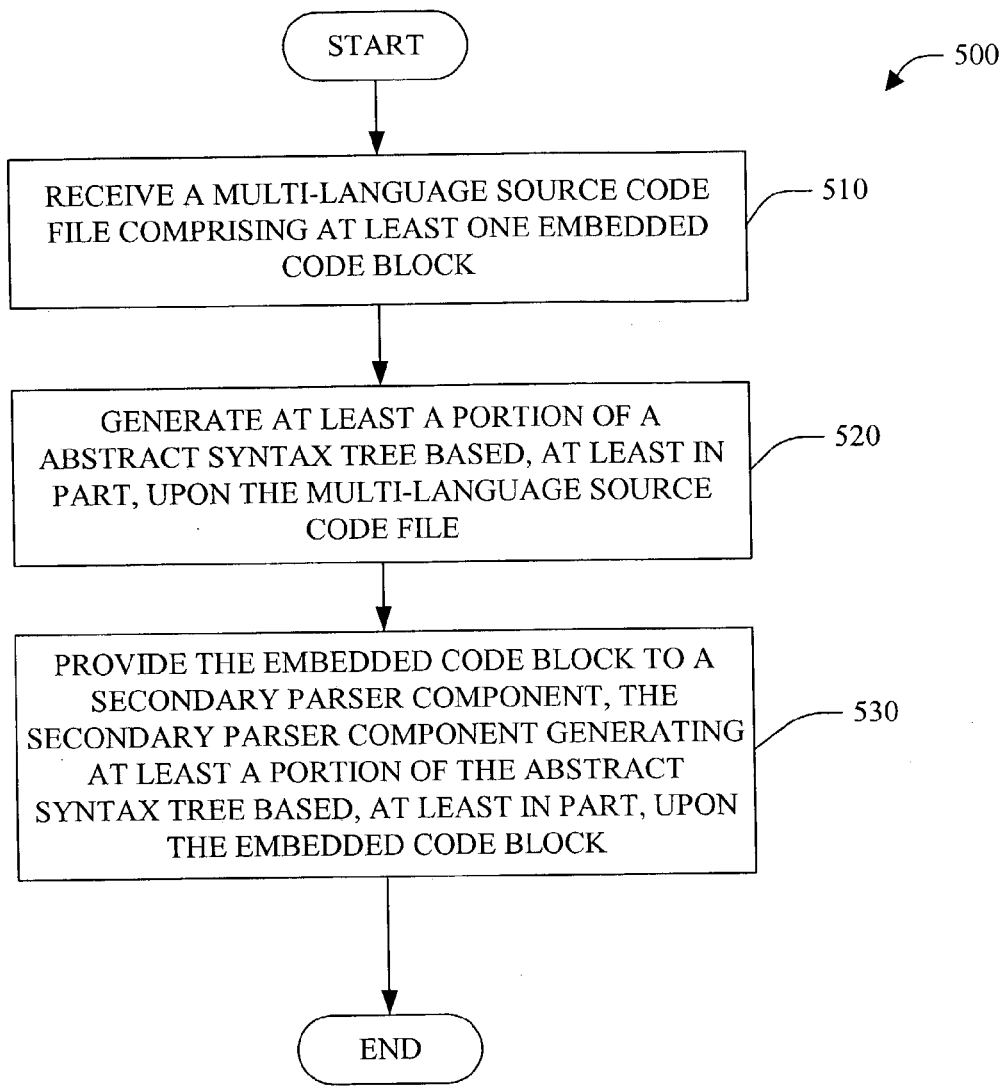
FIG. 5 is a flow chart of a method of parsing a multi-language source code file in accordance with an aspect of the present invention.

Referring to FIG. 5, a method of parsing a multi-language source code file in accordance with an aspect of the present invention is illustrated. At 510, a multi-language source code file comprising at least one embedded code block is received (e.g., markup language with embedded code blocks(s) of general purpose programming language(s) and/or scripting language(s)). At 520, at least a portion of an AST is generated based, at least in part, upon the multi-language source code file (e.g., by a primary parser component 110). At 530, the embedded code block is provided to a secondary parser component (e.g., secondary parser component(s) 140) and the secondary parser component generates at least a portion of the AST based, at least in part, upon the embedded code block. For example, the secondary parser component can be associated with a general purpose programming language and/or a scripting language.

Figure 6:
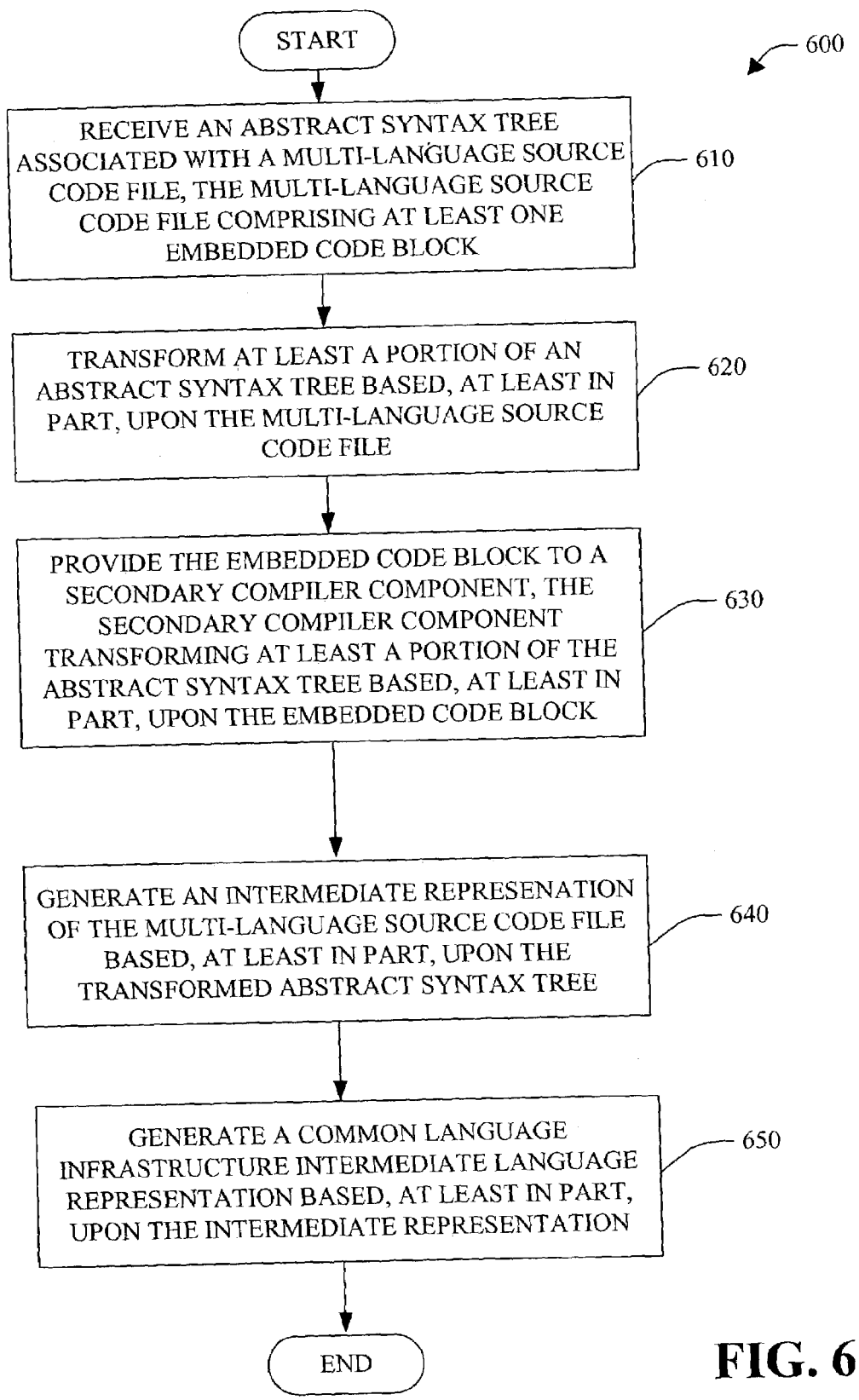
FIG. 6 is a flow chart of a method of compiling a multi-language source code file in accordance with an aspect of the present invention.

Turning to FIG. 6, a method of compiling a multi-language source code file in accordance with an aspect of the present invention is illustrated. At 610, an AST associated with a multi-language source code file comprising at least one embedded code block is received. At 620, at least a portion of an abstract syntax tree is transformed based, at least in part, upon the multi-language source code file. At 630, the embedded code block is provided to a secondary compiler component. The secondary compiler component transforms at least a portion of the abstract syntax tree based, at least in part, upon the embedded code block. At 640, an intermediate representation (IR) of the multi-language source code file is generated based, at least in part, upon the transformed abstract syntax tree. For example, node(s) of the abstract syntax tree can comprise a visitor method which facilitates translation of the abstract syntax tree into the intermediate representation of the multi-language source code file.

At 650, a common language infrastructure intermediate language representation of the multi-language source code file is generated based, at least in part, upon the intermediate representation of the multi-language source code file.

Figure 7:
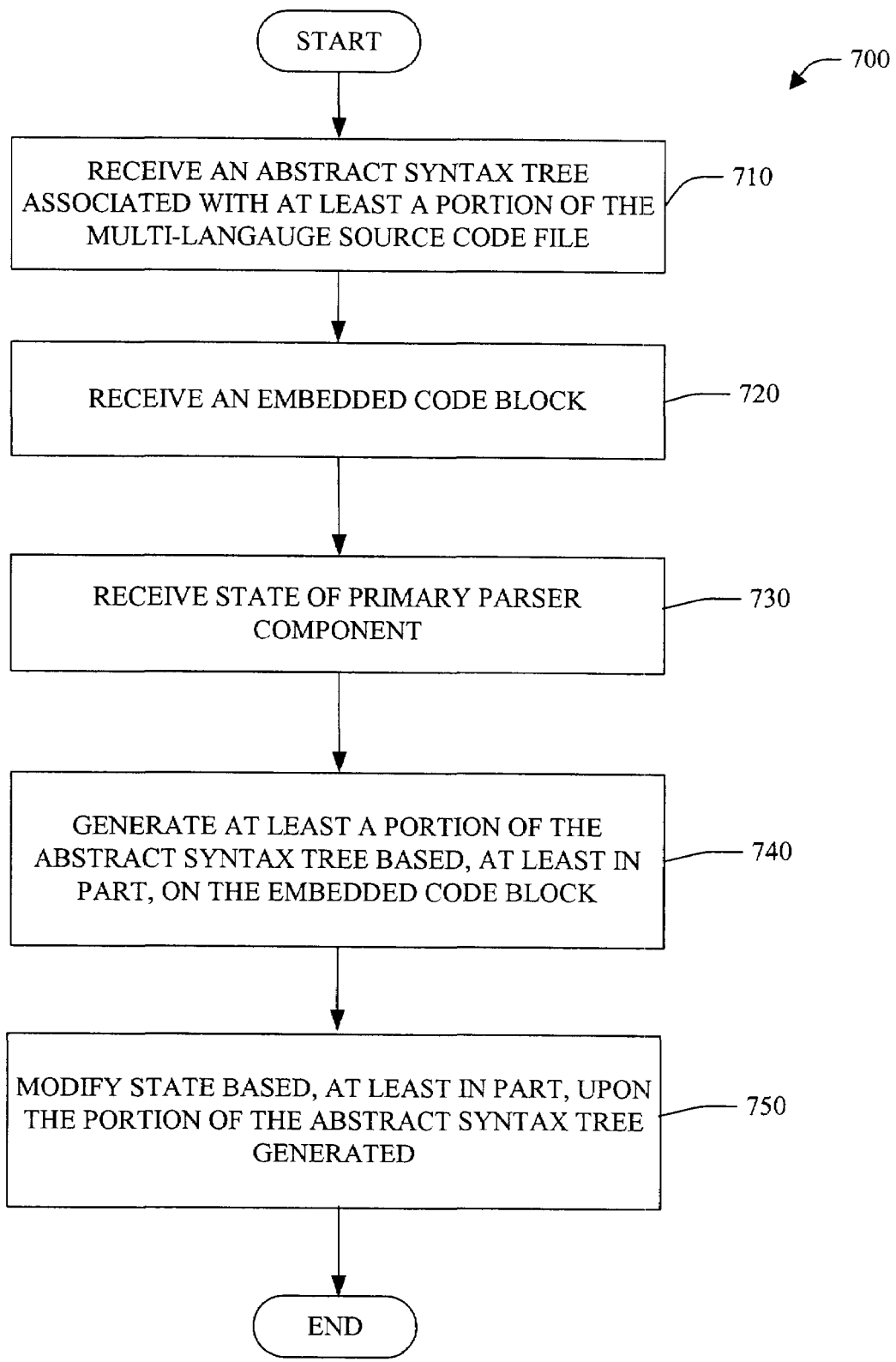
FIG. 7 is a flow chart of a method of parsing an embedded code block of a multi-language source code file in accordance with an aspect of -the present invention.

Next, referring to FIG. 7, a method of parsing an embedded code block of a multi-language source code file in accordance with an aspect of the present invention is illustrated. At 710, an AST associated with a least a portion of a multi-language source code file is received (e.g., by a parse extension component 140). At 720, an embedded code block is received. At 730, a state of a primary parser component is received.

At 740, at least a portion of the AST is generated based, at least in part, on the embedded code block. At 750, the state is modified based, at least in part, upon the portion of the AST generated.

Figure 8:
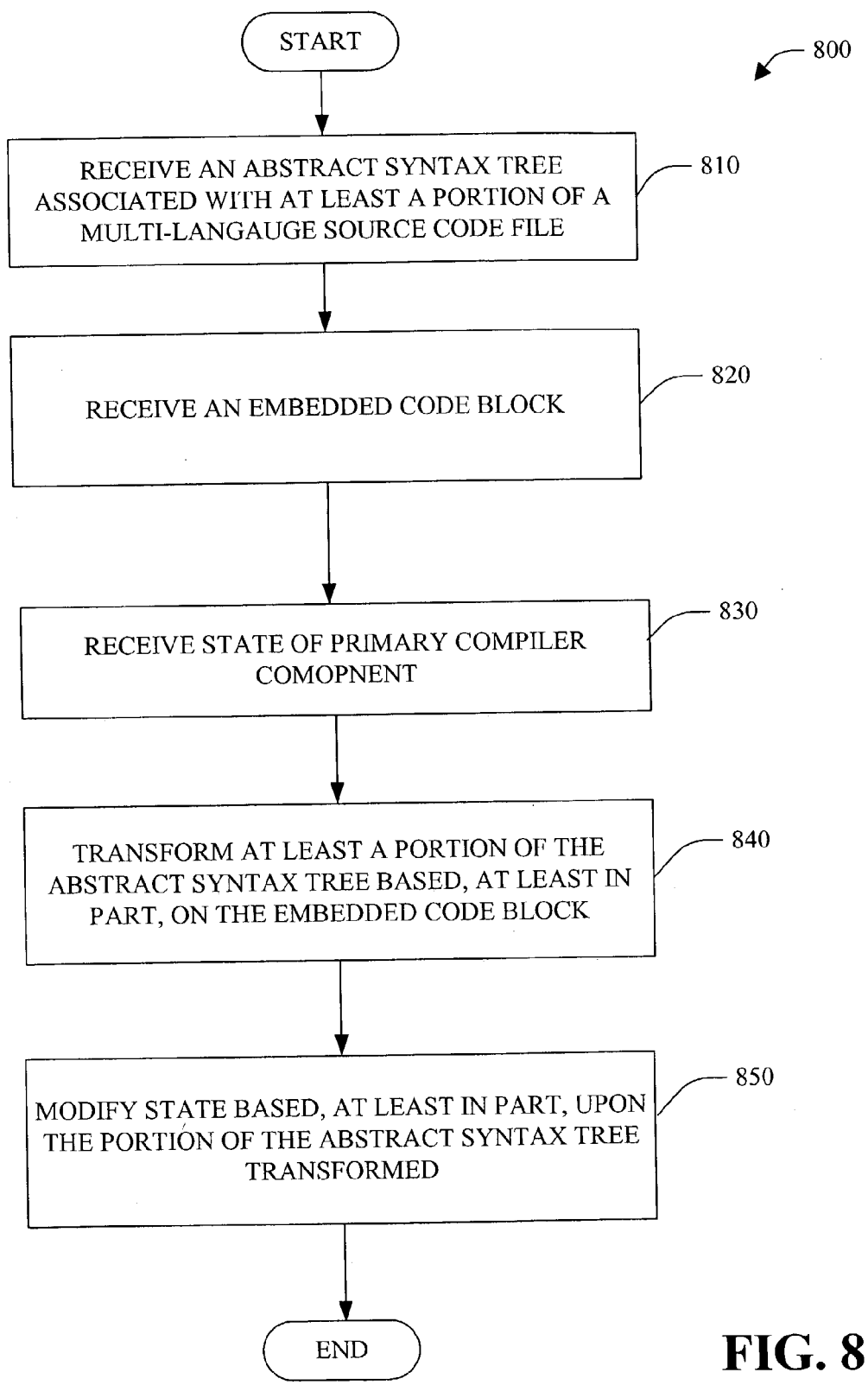
FIG. 8 is a flow chart of a method of compiling an embedded code block of a multi-language source code file in accordance with an aspect of the present invention.

Turning next to FIG. 8, a method of compiling an embedded code block of a multi-language source code file in accordance with an aspect of the present invention is illustrated. At 810, an abstract syntax tree associated with at least a portion of a multi-language source code file is received. At 820, an embedded code block is received. At 830, a state of a primary compiler component is received.

At 840, at least a portion of the abstract syntax tree is transformed based, at least in part, on the embedded code block. At 850, the state is modified based, at least in part, the portion of the abstract syntax tree transformed.

Figure 9:
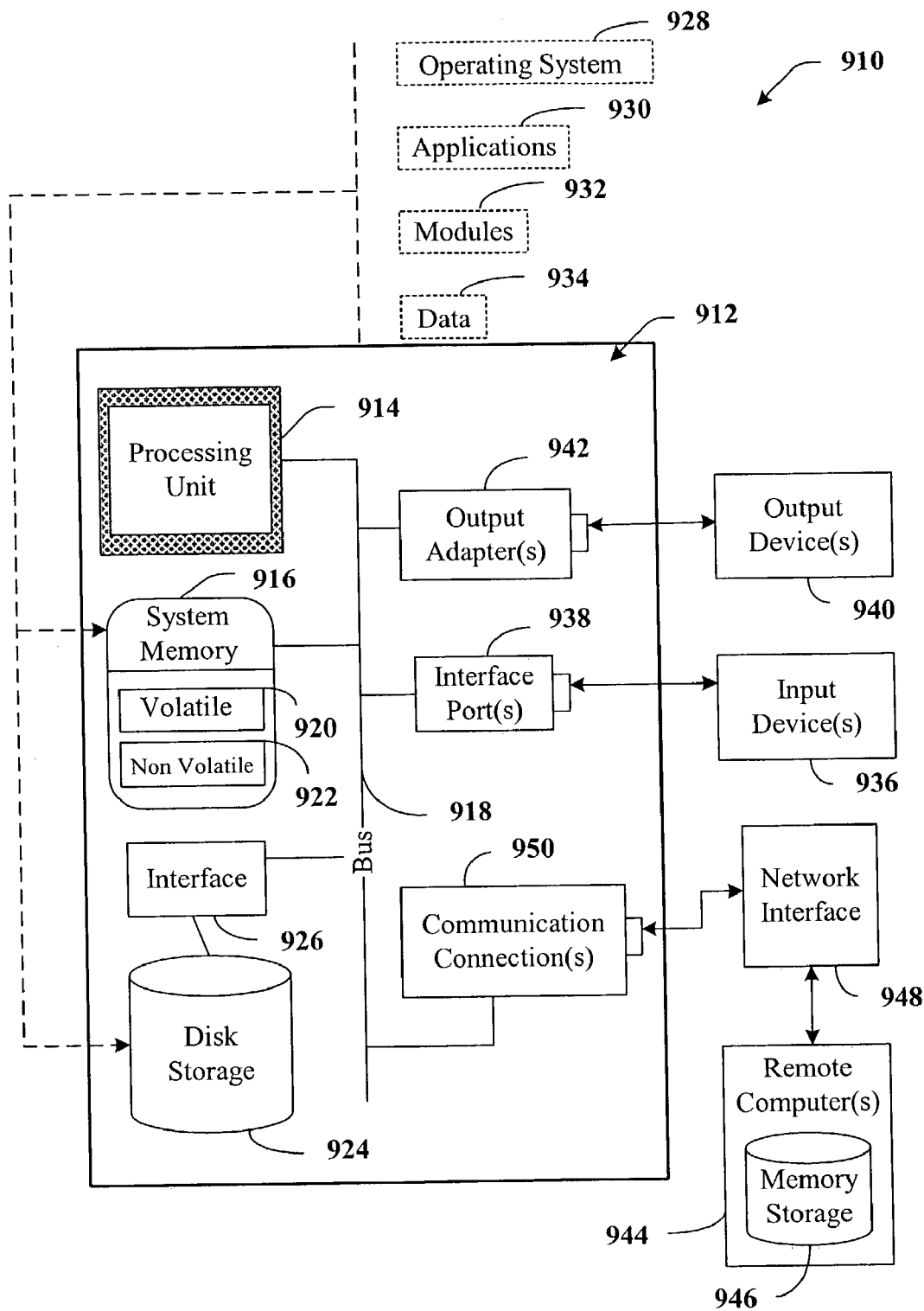
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multi-language compilation system comprising computer hardware for executing the following software components, the system is recorded on a computer-readable medium and capable of execution by a computer, comprising:
    a primary parser component that receives a multi-language source code file, wherein the multi-language source code file comprising a markup language with at least one embedded code block of a general purpose programming language and a scripting language, performs syntactical analysis of at least a portion of the multi-language source code file, generates at least a portion of an abstract syntax tree based, at least in part, upon the multi-language source code file, and provides the embedded code block to a secondary parser component, the secondary parser component generates at least a portion of the abstract tree based, at least in part, upon the embedded code block;
    a primary compiler component that receives the abstract syntax tree, performs semantic analysis of the abstract syntax tree, transforms at least a portion of the abstract syntax tree based, at least in part, upon the multi-language source code file, provides the embedded code block to a secondary compiler component, the secondary compiler component transforms at least a portion of the abstract syntax tree based, at least in part, upon the embedded code block, accesses the multi-language source code file and the abstract syntax tree to check for semantic errors, and generates an intermediate representation of the multi-language source code file based, at least in part, upon the transformed abstract syntax tree; and
    a common compiler infrastructure backend component that receives transformed abstract syntax tree, and generates a common language infrastructure intermediate language representation of the multi-language source code file.

2. The system of claim 1, further comprising at least one secondary parser component.

3. The system of claim 2, the secondary parser component associated with at least one of a general purpose programming language and a scripting language.

4. The system of claim 1, further comprising at least one secondary compiler component.

5. The system of claim 4, the secondary compiler component associated with at least one of a general purpose programming language and a scripting language.

6. The system of claim 1, wherein the markup language is XML.

7. The system of claim 1, the secondary parser component being based, at least in part, upon an extensible base class.

8. The system of claim 1, the secondary compiler component being based, at least in part, upon an extensible base class.

9. The system of claim 8, the extensible base class comprising at least one visitor method.

10. The system of claim 9, the visitor method facilitating transformation of the abstract syntax tree into the intermediate representation of the multi-language source code file.

11. A method of compiling a multi-language source code file comprising:
    receiving, by a primary parser component, the multi-language source code file, wherein the multi-language source code file comprises a markup language with at least one embedded code block of a general purpose programming language and a scripting language;
    performing syntactical analysis of at least a portion of the multi-language source code file;
    generating at least a portion of an abstract syntax tree based, at least in part, upon the multi-language source code file; and
    providing the embedded code block to a secondary parser component, the secondary parser component generating at least a portion of the abstract tree based, at least in part, upon the embedded code block;
    receiving, by a primary compiler component, the abstract syntax tree;
    performing semantic analysis of at least a portion of the abstract syntax tree;

transforming at least a portion of the abstract syntax tree based, at least in part, upon the multi-language source code file;

providing the embedded code block to a secondary compiler component, the secondary compiler component transforming at least a portion of the abstract syntax tree based, at least in part, upon the embedded code block;

accessing the multi-language source code file and the abstract syntax tree to check for semantic errors; and generating an intermediate representation of the multi-language source code file based, at least in part, upon the transformed abstract syntax tree; and receiving, by a common compiler infrastructure backend component, the transformed abstract syntax tree; and generating a common language infrastructure intermediate language representation of the multi-language source file based, at least in part, upon the intermediate representation of the multi-language source code file.

12. The method of claim 11, the secondary parser component being associated with at least one of a general purpose programming language and a scripting language.

13. The method of claim 11, at least one node of the abstract syntax tree comprising a visitor method, the visitor method facilitating transformation of the abstract syntax tree into the intermediate representation of the multi-language source code file.

14. A computer readable medium storing computer executable components of a multi-language compilation system comprising:

a primary parser component that receives a multi-language source code file, wherein the multi-language source code file comprises a markup language with at least one embedded code block of a general purpose programming language and a scripting language, performs syntactical analysis of at least a portion of the multi-language source code file, generates at least a portion of an abstract syntax tree based, at least in part, upon the multi-language source code file, and provides the embedded code block to a secondary parser component, the secondary parser component generates at least a portion of the abstract tree based, at least in part, upon the embedded code block;

a primary compiler component that receives the abstract syntax tree, performs semantic analysis of the abstract syntax tree, transforms at least a portion of the abstract syntax tree based, at least in part, upon the multi-language source code file, provides the embedded code block to a secondary compiler component, the secondary compiler component transforms at least a portion of the abstract syntax tree based, at least in part, upon the embedded code block, accesses the multi-language source code file and the abstract syntax tree to check for semantic errors, and generates an intermediate representation of the multi-language source code file based, at least in part, upon the transformed abstract syntax tree; and a common compiler infrastructure backend component that receives transformed abstract syntax tree, and generates a common language infrastructure intermediate language representation of the multi-language source code file.

15. A multi-language compilation system comprising computer hardware for executing the following software components, the system is recorded on a computer-readable medium and capable of execution by a computer, comprising:

means for receiving, by a primary parser, the multi-language source code file, wherein the multi-language source code file comprises a markup language with at least one embedded code block of a general purpose programming language and a scripting language;

means for performing syntactical analysis of at least a portion of the multi-language source code file;

means for generating at least a portion of an abstract syntax tree based, at least in part, upon the multi-language source code file; and means for providing the embedded code block to a secondary parser component, the secondary parser component generating at least a portion of the abstract tree based, at least in part, upon the embedded code block;

means for receiving, by a primary compiler component, the abstract syntax tree;

means for performing semantic analysis of at least a portion of the abstract syntax tree;

means for transforming at least a portion of the abstract syntax tree based, at least in part, upon the multi-language source code file;

means for providing the embedded code block to a secondary compiler component, the secondary compiler component transforming at least a portion of the abstract syntax tree based, at least in part, upon the embedded code block;

means for accessing the multi-language source code file and the abstract syntax tree to check for semantic errors; and means for generating an intermediate representation of the multi-language source code file based, at least in part, upon the transformed abstract syntax tree; and means for receiving, by a common compiler infrastructure backend component, the transformed abstract syntax tree; and means for generating a common language infrastructure intermediate language representation of the multi-language source file based, at least in part, upon the intermediate representation of the multi-language source code file.

* * * * *